J. P. KUHNS.
SHIPPING TAG MAKING MACHINE.
APPLICATION FILED FEB. 2, 1903.
1,047,089.
Patented Dec. 10, 1912.
3 SHEETS—SHEET 1.
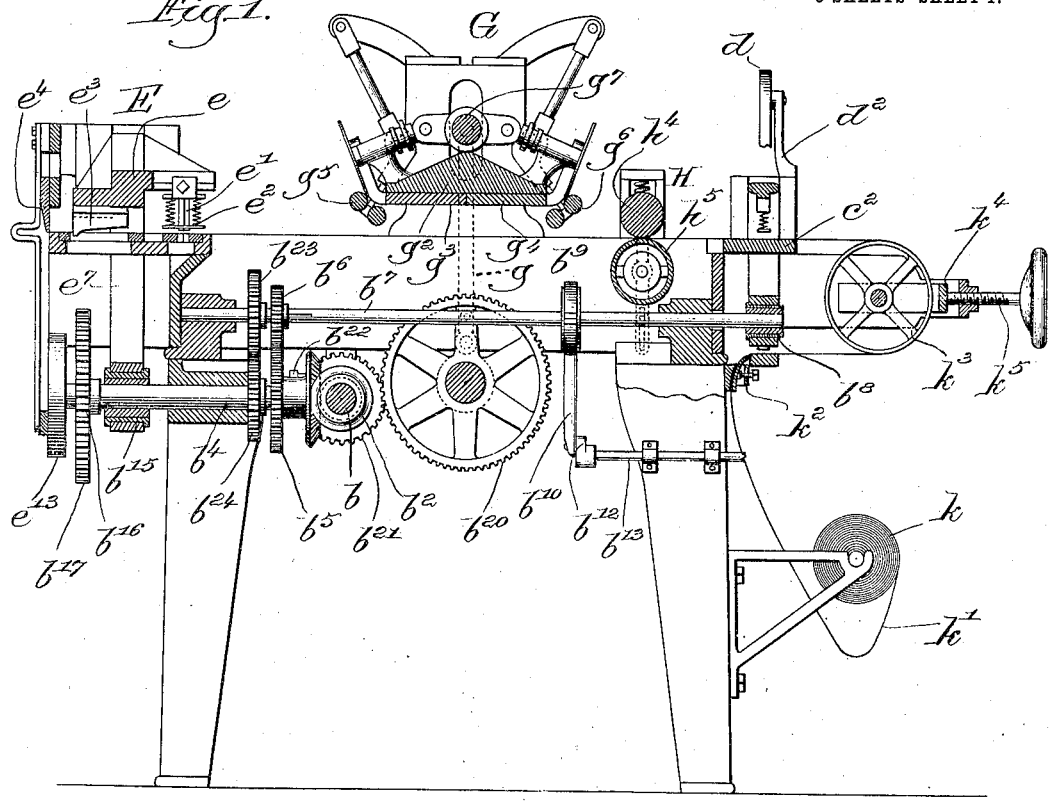
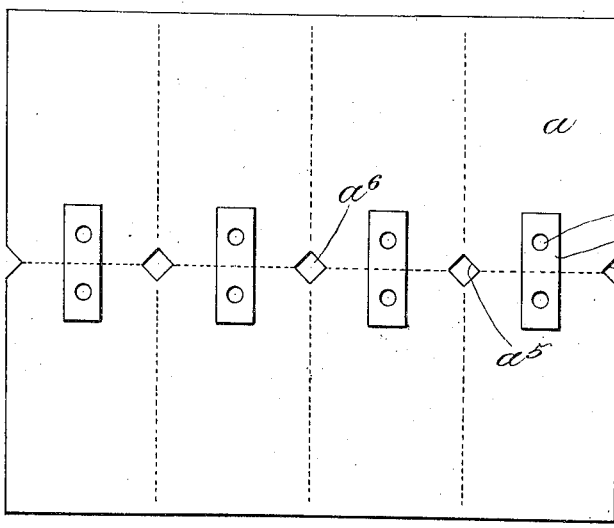
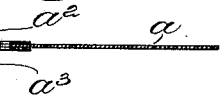
Witnesses.
Thomas J. Drummond.
W. C. Lunsford.
Inventor.
John P. Kuhns,
by Crosby Gregory.
Attys.

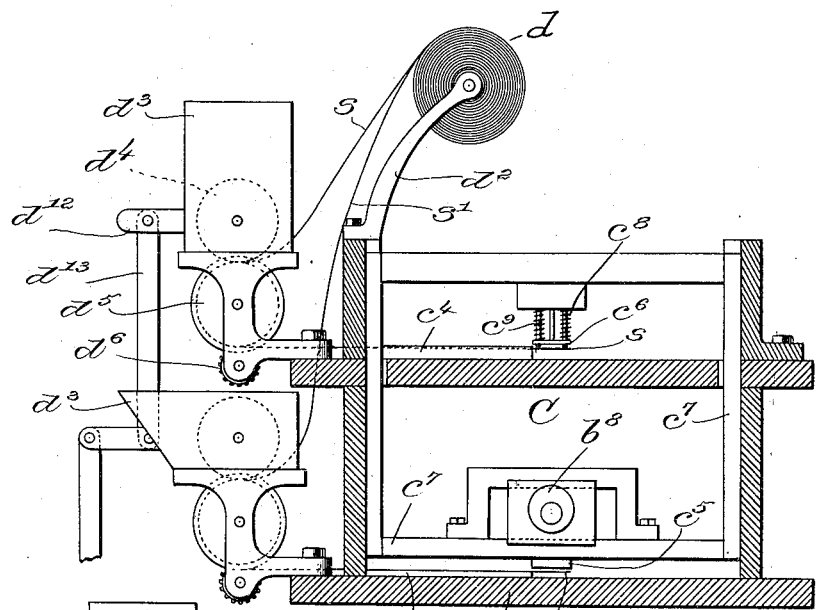
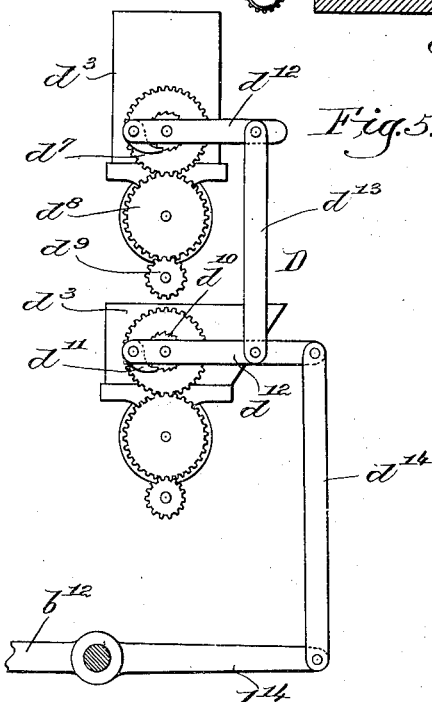
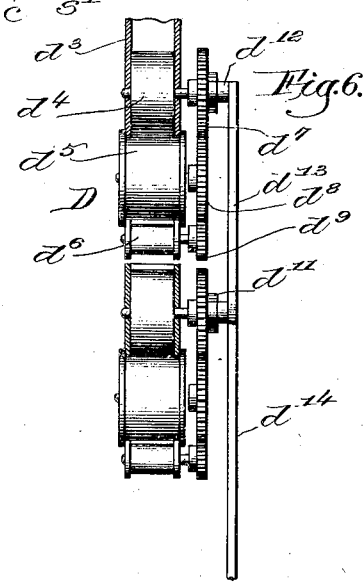

J. P. KUHNS.
SHIPPING TAG MAKING MACHINE.
APPLICATION FILED FEB. 2, 1903.
1,047,089.
Patented Dec. 10, 1912.
3 SHEETS—SHEET 3.
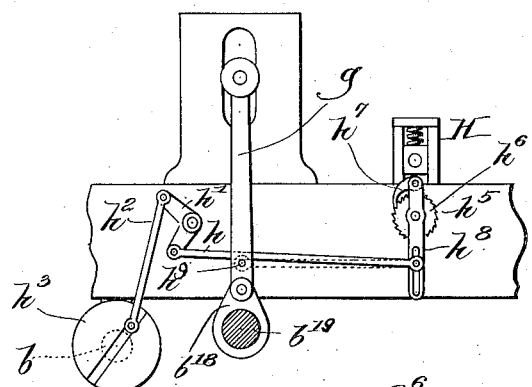
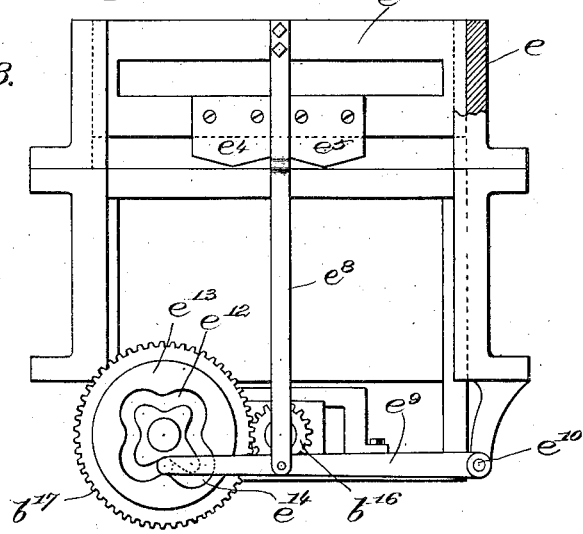
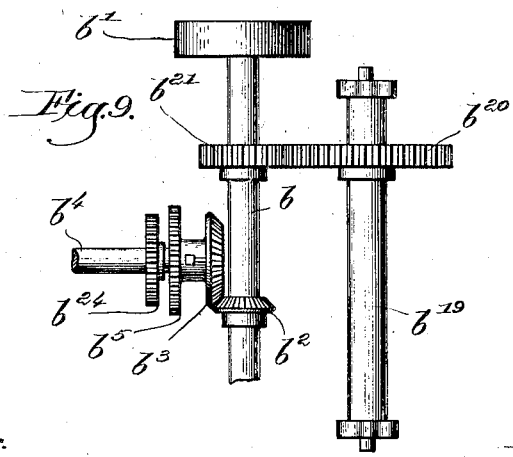
Witnesses.
Thomas J. Drummond.
W. C. Lunsford.
Inventor.
John P. Kuhns,
by Crosby & Gregory.
Attys.

UNITED STATES PATENT OFFICE.

JOHN P. KUHNS, OF DAYTON, OHIO, ASSIGNOR TO NATIONAL TAG COMPANY, OF DAYTON, OHIO, A CORPORATION OF MAINE.

SHIPPING-TAG-MAKING MACHINE.

1,047,089.  Specification of Letters Patent.  Patented Dec. 10, 1912.

Application filed February 2, 1903. Serial No. 141,525.

*To all whom it may concern:*

Be it known that I, JOHN P. KUHNS, a citizen of the United States, residing at Dayton, county of Montgomery, State of Ohio, have invented an Improvement in Shipping-Tag-Making Machines, of which the following description, in connection with the accompanying drawings, is a specification, like letters on the drawings representing like parts.

My invention is a machine for making shipping tags, and has for its object a provision not only of means for cutting and printing the tags, but for applying reinforcing strips to the string-receiving holes.

The various advantages and further details of my invention will be pointed out in the course of the following description, reference being had to the accompanying drawings, in which I have shown one embodiment of my invention.

In the drawings, Figure 1 is a vertical longitudinal sectional view of the machine; Figs. 2 and 3 show, in top plan and longitudinal section, the construction of the tag which it is the object of the machine to make; Fig. 4 is an enlarged cross-sectional detail showing in front elevation the patch-applying mechanism; Fig. 5 shows in side elevation the operating mechanism for the strip-feeding and pasting device; Fig. 6 is a view looking toward the right, Fig. 5, parts being in section, and broken away for clearness of illustration; Fig. 7 is a fragmentary detail in side elevation of the feeding-mechanism and a portion of the operating mechanism for printing; Fig. 8 is an end elevation of the machine at the left end, Fig. 1; Fig. 9 shows a portion of the gearing of the machine viewed in top plan, parts being broken away.

One form of tag which this machine is adapted to make is shown in Figs. 2 and 3, Fig. 2 showing eight of these tags to be severed on the dotted lines, from which it will be seen that the tag $a$ has a string-receiving opening $a'$ to which is applied an upper reinforcing patch or piece of tough paper $a^2$ and a similar under reinforcing patch $a^3$, the corners of the tag being cut away at $a^4$, $a^5$. The reinforcing strips or patches are applied to opposite tags in pairs, as shown clearly in Fig. 2, and the meeting corners of four tags are cut or beveled simultaneously by punching out a preferably square hole $a^6$.

As herein shown, a drive shaft $b$ operated by any convenient means, as a band pulley $b'$, carries a beveled gear $b^2$ in mesh with a gear $b^3$ normally loose on a shaft $b^4$ connected by gears $b^5$, $b^6$ to drive a longitudinal shaft $b^7$, whose eccentric $b^8$ at the forward end of the machine operates the punching and patch-applying mechanism C, and slightly back therefrom I have provided said shaft with another eccentric $b^9$ having an arm $b^{10}$ connected to a crank $b^{12}$ of a shaft $b^{13}$, at whose opposite end is another crank $b^{14}$, see Fig. 5, for driving the paste-applying and strip-feeding mechanism D, while at the opposite end of the machine the shaft $b^4$ has an eccentric $b^{15}$ and gearing $b^{16}$, $b^{17}$ for operating the tag-forming and severing mechanism E, the printing mechanism G being operated by links $g$ connected to cranks $b^{18}$ of a shaft $b^{19}$ provided with a gear $b^{17}$ for operating the tag-forming and sever-drive shaft $b$. The paper web-feeding mechanism H is shown as driven from the shaft $b$ by a link $h$ connected to a bell crank $h'$ and rod $h^2$ adjustable in a face plate $h^3$ on the shaft $b$.

At any convenient point I mount a web roll $k$ provided with a web of suitable material, herein shown as paper $k'$ having a width of the length of two tags, as indicated in Fig. 2, said web being passed through a friction device or retarding clamp $k^2$, and thence over a bar or ledge $c$ constituting part of the frame of the machine, and around a tension or registering roll $k^3$ mounted in a sliding hanger $k^4$, and adjustable by a hand screw $k^5$ toward and from the machine, the web passing from this roll over a second ledge or plate $c^2$, also constituting a part of the frame of the machine, and thence in turn to the feeding mechanism, printing mechanism, and severing mechanism.

The strips of patch paper or reinforce material are carried on a reel $d$ mounted on a bracket $d^2$ above the patch-applying mechanism, one strip $s$ being delivered to an upper pasting mechanism and the other strip $s'$ being delivered to a lower pasting mechanism, each of these mechanisms being similar, hence a description of one sufficing for both.

Viewing Figs. 5 and 6 it will be seen that suitable paste or glue-holding reservoirs or receptacles $d^3$ are provided containing paste-delivering and feeding rolls $d^4$ coöperating with a lower feed roll or drum $d^5$, the latter being the width of the strip and the former slightly narrower, as shown clearly in Fig. 6. The strip passes around said drum $d^5$ and is further fed by engagement with the flanges of a roll $d^6$, these several rolls being operated by a train of gears $d^7$, $d^8$, $d^9$, and a ratchet $d^{10}$ and pawl $d^{11}$ from levers $d^{12}$ and links $d^{13}$, $d^{14}$ from the crank or arm $b^{14}$. The strips are delivered by the drum $d^5$ and flanges of the drum $d^6$ to channels formed in receiving guides $c^4$ emerging therefrom beneath cutter blocks $c^5$, $c^6$ mounted on a frame $c^7$ actuated by the eccentric $b^8$ before referred to. The upper cutter block $c^6$ is held yieldingly by springs $c^8$ so as to act as a stripper for the punches $c^9$, which punch the holes $a'$ in the tags. As the paper web passes to the plate $c$, the patch strip is cut off and is pressed down upon the web by the cutter block $c^5$, the pressure thereof being sufficient not only to insure proper contact of the patch with the web, but also to spread the paste or glue over the entire surface of the latter. This is of importance, as it enables me to run the machine rapidly without danger of smearing the parts and fouling the machine. The gluer-roll $d^4$ applies glue only to the intermediate part of the patch strip, leaving the edges thereof clean, so that when the roll $d^6$ feeds the same forward it does not come in contact with the glue, and when the patch is pressed down upon the web there is just enough glue thereon to be pressed out to the edges and cement the entire patch properly; whereas if the entire patch had been covered with glue the pressure would have spread the glue or paste beyond the patch, interfering with the appearance and proper manufacture of the tags. The patch having been placed by the cutter block $c^5$ (which, besides acting as cutter, performs the office of a patch or reinforce applier) on one side of the web, the web travels over the registering roll $k^3$ so as to bring said patch on the under side of the web as the latter is fed forward beneath the upper patch applier and cutter, whereupon the upper patch is placed in proper alinement directly over the under patch, and is applied in a similar manner, the two holes being punched therein simultaneously with the cutting off and applying of the patch.

To permit the proper applying of the patch, I have provided a step-by-step feeding mechanism, shown in Figs. 1 and 7. This feeding mechanism may be of any suitable kind, but as herein shown it comprises a spring-pressed upper roll $h^4$ and a ratcheted under roll $h^5$ at the end of whose shaft is a ratchet $h^6$ operated by a pawl $h^7$ on the end of a slotted arm $h^8$ operated by the link $h$, the adjustment of said link in said arm, and of the link $h^2$, permitting the paper to be fed at one speed or at another, as required for purposes to be presently described.

The printing mechanism may be of any suitable kind, and accordingly I have omitted many of the details thereof, showing merely sufficient parts to enable my invention to be understood. The chase or type bed $g^2$ is arranged in a plurality of parts, herein shown as two, $g^3$, $g^4$, inked by rollers $g^5$, $g^6$, respectively, said chase or type carrier $g^2$ being raised and lowered by opposite links $g$ connected thereto at the ends of a cross-bar $g^7$. As herein shown this printing mechanism is depressed once for every two feeding movements of the machine.

The severing mechanism and reinforce-applying mechanism must always operate in unison (i. e., if one operates a certain number of times for a given length of web, the other must operate the same number of times), as the machine is herein shown as arranged to provide one reinforce only for each tag, and hence a tag must be severed every time a reinforce is applied; but the feeding mechanism is made capable of feeding the strip forward either once for each tag or twice for each tag, according to the kind of printing which is required.

If it is desired to print each tag in two colors (one color on the part $g^3$ and one color on the part $g^4$ of the printing press), then the distance of each feed will be half the width of a tag, so that a tag will first be printed by the part $g^4$ and then will be fed forward twice, equaling the width of the tag, so that when the press comes down next time said tag will be printed by the part $g^3$.

If it is not desired to print in two colors, but the mechanism is availed of for the purpose of providing a large output in one color, rather than a smaller output in two colors, then the parts $g^3$, $g^4$, will be set up with duplicate forms of type matter, and the feeding mechanism will be set to feed the distance of the width of a tag at each feed, so that two tags will be printed at one descent of the press, and when the press descends the next time the next two tags will be in place to be printed.

If one impression of the printing press is desired to one feed of the feeding mechanism, a link may be connected from the lever $h^8$ to a stud $h^9$ on the link $g$, as indicated in dotted lines, Fig. 7.

The severing mechanism is mounted on a head $e$ and comprises a punch $e'$ for making the holes $a^6$, said punch having a yieldingly supported stripper plate $e^2$, a longitudinal severing knife $e^3$ for making the incisions from one hole $a^6$ to the next, and also cutting the patches transversely, see Fig. 2, and transverse cutting blades $e^4$, $e^5$. The knives $e^4$, $e^5$ are preferably supported on an auxiliary frame $e^6$, and while the rest of the severing mechanism is operated by the cam $b^{15}$, already referred to, and a strap $e^7$ therefrom, the frame $e^6$ is operated by a rod $e^8$ and lever $e^9$ pivoted at one end at $e^{10}$ and having its other end engage with a path cam $e^{12}$ of a cam $e^{13}$ driven by the gear $b^{17}$, already referred to.

The cam $e^{12}$, it will be noticed, is arranged to rotate once for every four rotations of the eccentric $b^{15}$ and has three similar comparatively shallow deflections in its cam path and one deeper deflection $e^{14}$, the result being that the knives $e^4$, $e^5$ are brought down for three cuts a distance which will only partially sever the web, but the fourth time the web is entirely severed, the result being that the tags are retained in bunches of four, for convenience of packing and handling, the four, however, being so nearly severed (as indicated by dotted lines in Fig. 2) as to be conveniently separated by hand when required for use.

To permit the machine to print in two colors or one color, as mentioned above, or to print slowly or rapidly (according as the printing press makes two impressions on each tag or one only), I provide for a change of web feed as already explained, and also a change of severing movement, the latter being shown best in Figs. 1 and 9, where it will be seen that the gears $b^3$, $b^5$ are connected together, and are normally loose on the shaft $b^4$, but may be clutched therewith by any convenient hand clutch $b^{22}$, the gear $b^6$ being splined on the shaft $b^7$ to rotate therewith, but free to be moved laterally to the right, Fig. 1, and said shaft $b^7$ carrying fast thereon a pinion $b^{23}$ in mesh with the gear $b^{24}$ on the shaft $b^4$, these several gears being so proportioned that when the clutch $b^{22}$ is out of engagement with the shaft $b^4$ and the gear $b^5$ is in mesh with the gear $b^6$, as shown in Fig. 1, the cutting mechanism will be reciprocated twice to once of the printing mechanism, and when the clutch $b^{22}$ is in engagement with its shaft $b^4$, and the gear $b^6$ is shifted to the right out of engagement with the gear $b^5$, the cutting mechanism and the printing mechanism will operate in the same time.

It will be understood that I have shown and described one form merely of my mechanism, and that wide variations in details may be resorted to without departing from the spirit and scope of the invention.

One aim has been to simplify the mechanism, and with this in view, I have provided that the reinforcing strips or patches shall be pushed into place, instead of feeding them in usual manner, this arrangement saving mechanism and insuring neatness and accuracy. The registering mechanism for making the web come into proper alinement for receiving the two patches is provided as a convenient means for permitting one patch to be applied before the other, instead of requiring them both to be applied at the same point of travel in the machine. Also by having one patch applied before the other the subsequent punching of the holes when the other patch is applied is less liable to disturb it or prevent its being placed correctly, than if both patches were applied at the same time; and by having the cut-off block also act as a presser for firmly holding or ironing the patch down upon the web, there is no chance for the patch to become displaced or improperly positioned.

By having the printing mechanism all on one head, not only is the mechanism simplified, but I obtain perfect accuracy of alinement, a definite square impression is obtained by the straight up-and-down movement, printing in a plurality of colors is made convenient, and the progress of the formation of the tag is not interrupted or diverted. Likewise by having all the severing mechanism practically on one head, the same simplicity of mechanism and facility of movement are accomplished, and it is made extremely convenient to change the speed of cutting and feeding relatively to the printing, having one speed for printing in two colors, and double speed for printing in one color.

It will be understood that, as shown, the printing mechanism is arranged to descend upon four tags at once.

The machine as herein shown is constructed to make two rows of tags at the same time, and the printing bed or chase is shown as having a double width ($g^3$, $g^4$) for printing two tags in width. These and other features may be varied as already intimated.

Further advantages of my invention will be recognized by those skilled in this art; and without attempting to point out all the advantages of use and all the modifications and changes included within my invention, what I claim as new and desire to secure by Letters Patent, is:—

1. A tag making machine, comprising means for applying reinforces to the successive tags, printing mechanism for printing said tags including two portions for engaging two successive tags, severing mechanism for severing the tags, feeding mechanism, means for operating said reinforce-applying mechanism and said severing mechanism in unison, and means for varying the speed of said operating means of the reinforce-applying mechanism and the severing mechanism with relation to and in multiples of the impression-movements of said printing mechanism, and speed varying means to maintain the speed of the feeding mechanism the same as said speed of the reinforce-applying mechanism and of the severing mechanism, in accordance with the varying speed of the latter, whereby the machine is rendered capable of printing with one chase of type each tag in one color only or each tag in a plurality of colors as desired.

2. In a machine of the kind described, mechanism for pushing two strips of reinforcing material for two reinforces forward into position to be applied to the opposite sides of a single web, means for simultaneously cutting directly and entirely across the free ends of said two strips, when fed to position to form the reinforces, means for applying the entire ends thus cut off to the opposite sides of the same web, and means for intermittingly feeding forward transversely to said strips said single web of tag material in the intervals between the applications to said web of the reinforces.

3. In a machine of the kind described, means for feeding an integral double width of web to be formed into two continuous, originally-attached series of tags with their string-receiving ends together down the middle of the web, means for feeding a strip of reinforce material transversely to said double width web, means for cutting off the entire projecting free end from the strip and applying said entire end to said web in position to constitute two reinforces, and means for thereafter punching two string-receiving holes through said web and applied reinforce, one for each of the two tags of said double width.

4. In a machine of the kind described, means for feeding a double width of web to be formed into two series of tags, means for feeding a strip of reinforce material transversely to said web, means for cutting off the free end of the strip in the form of an oblong portion, means for applying and securing said oblong portion to the web to rest on the adjacent ends of opposite tags, and means for thereafter severing said tags and said reinforce material thus applied thereto.

5. In a machine of the kind described, means for feeding a web of paper, means for applying a reinforce to one side of said web, means for applying another reinforce to the opposite side of said web, said two applying means being located apart a distance leaving a longitudinal stretch of web extending lengthwise from one to the other, and adjustable means for varying the position of the web with relation to said two applying means, for insuring that said two reinforces shall be in proper alinement opposite each other.

6. In a machine of the kind described, means for feeding a web of paper to be formed into successive tags, means for applying to said tags two reinforces, alined with each other on the opposite sides of said web, mechanism for pushing strips of reinforce material forward to position, and means for simultaneously severing and applying the free ends of said strips to constitute such reinforces.

7. In a machine of the kind described, means for feeding a web of paper, means for maintaining a loop in the said web, whereby the top of the web on one side of said loop is the bottom of the loop on the other side, and means for applying reinforces to said web at opposite portions of said loop and on the same side thereof.

8. In a machine of the kind described, means for feeding a web of paper, means for maintaining a loop in the said web, whereby the top of the web on one side of said loop is the bottom of the loop on the other side, means for applying reinforces to said web at opposite portions of said loop and on the same side thereof, and means for actuating said applying means for applying said reinforces simultaneously.

9. In a machine of the kind described, means for feeding a web of paper, means for supplying reinforcing material, means for applying glue to the middle only of said material, feeding means for engaging the edges of said material outside of the glued portion thereof and feeding the same transversely to the web, and means for severing short oblong end-pieces from said reinforcing material and applying said end-portions to the web.

10. In a machine of the kind described, means for feeding a web of paper, means for supplying reinforcing material, means for applying glue to the middle only of said material, feeding means for engaging the edges of said material outside of the glued portion thereof and feeding the same to the web, means for severing and applying under pressure pieces of said material to said web, and means for thereafter punching a plurality of string-receiving holes through each piece and said web.

11. In a machine of the kind described, means for feeding a web of paper, means for supplying a strip of reinforcing material, means for applying glue to the middle only of said material, feeding means for engaging the edges of said material outside of the glued portion thereof and feeding the same to the web, and a combined cutter, punch, and patch-applier, for severing the end from said strip to constitute a reinforce, applying it to the web, and thereafter punching a hole through both the web and reinforce.

In testimony whereof, I have signed my name to this specification, in the presence of two subscribing witnesses.

JOHN P. KUHNS.

Witnesses:
 HARLOW E. SPRING,
 MARION V. DE GARENO.